United States Patent
O'Connor et al.

(10) Patent No.: US 10,961,324 B2
(45) Date of Patent: Mar. 30, 2021

(54) METHOD FOR PREPARATION OF NOVEL MODIFIED BIO BASED MATERIALS

(71) Applicant: BIOECON INTERNATIONAL HOLDING N.V., Hoevelaken (NL)

(72) Inventors: Paul O'Connor, Hoevelaken (NL); Igor Babich, Enschede (NL); Jacobus Johannes Leonardus Heinerman, Abcoude (NL); Lixian Xu, Eindhoven (NL); Johan Van Den Bergh, Dordrecht (NL)

(73) Assignee: BIOECON INTERNATIONAL HOLDING N.V., Hoevelaken (NL)

( * ) Notice: Subject to any disclaimer, the term of this patent is extended or adjusted under 35 U.S.C. 154(b) by 0 days.

(21) Appl. No.: 15/764,395

(22) PCT Filed: Sep. 29, 2016

(86) PCT No.: PCT/EP2016/073202
§ 371 (c)(1),
(2) Date: Mar. 29, 2018

(87) PCT Pub. No.: WO2017/055407
PCT Pub. Date: Apr. 6, 2017

(65) Prior Publication Data
US 2018/0282437 A1    Oct. 4, 2018

(30) Foreign Application Priority Data

Oct. 1, 2015 (EP) .................................... 15187825
Feb. 16, 2016 (EP) .................................... 16155948

(51) Int. Cl.
*C08B 15/02* (2006.01)
*C08B 15/08* (2006.01)
(Continued)

(52) U.S. Cl.
CPC ............ *C08B 15/02* (2013.01); *C08B 15/08* (2013.01); *C08B 16/00* (2013.01); *C08H 8/00* (2013.01)

(58) Field of Classification Search
CPC ..................................................... C08B 15/02
(Continued)

(56) References Cited

U.S. PATENT DOCUMENTS

| 2009/0011473 | A1* | 1/2009 | Varanasi | ................. | C12P 19/14 |
| | | | | | 435/99 |
| 2010/0234586 | A1* | 9/2010 | O'Connor | ................ | C07H 1/00 |
| | | | | | 536/56 |

(Continued)

FOREIGN PATENT DOCUMENTS

| EP | 2620442 A1 | 7/2013 |
| WO | 2010106057 A1 | 9/2010 |

(Continued)

OTHER PUBLICATIONS

Fischer et al: "Inorganic molten salts as solvents for cellulose", CELLULOSE, vol. 10, Sep. 1, 2003 (Sep. 1, 2003), pp. 227-236, XP002310360.

*Primary Examiner* — Douglas B Call
(74) *Attorney, Agent, or Firm* — David Owen; Hoyng Rokh Monegier

(57) ABSTRACT

A process is disclosed for converting cellulose to nanocellulose. The process comprises dissolving a cellulose feedstock in an inorganic molten salt solvent medium. The solvent medium is substantially proton free. The solvent medium may contain a proton scavenger.
The process is carried out at relatively low temperatures, and requires little input of mechanical energy.

10 Claims, 2 Drawing Sheets

(51) Int. Cl.
*C08H 8/00* (2010.01)
*C08B 16/00* (2006.01)

(58) Field of Classification Search
USPC .......................................................... 127/34
See application file for complete search history.

(56) References Cited

U.S. PATENT DOCUMENTS

2012/0160433 A1* 6/2012 Vehvilainen ........... D21C 9/007
162/24
2015/0135991 A1* 5/2015 Tang ......................... C08L 1/00
106/204.01

FOREIGN PATENT DOCUMENTS

| WO | 2014009517 A1 | | 1/2014 |
|----|---------------|---|--------|
| WO | WO2014056383 | * | 4/2014 |
| WO | 2016087186 A1 | | 6/2016 |

* cited by examiner

METHOD FOR PREPARATION OF NOVEL MODIFIED BIO BASED MATERIALS

CROSS REFERENCE TO RELATED APPLICATION

This application is a 35 U.S.C. 371 National Phase Entry Application from PCT/EP2016/073202, filed Sep. 29, 2016, which claims the benefit of European patent application no. 15187825.3 filed Oct. 1, 2015 and European patent application no. 16155948.9 filed 16 Feb. 2016, the disclosure of which is incorporated herein in its entirety by reference.

BACKGROUND OF THE INVENTION

Field of the Invention

The invention relates generally to a process for converting cellulose to nanocellulose, and more particularly to such a process requiring little input of mechanical energy.

Description of the Related Art

Conventional methods for converting cellulose to nano fibrillated cellulose or nanocellulose typically require input of large amounts of mechanical energy. Some processes rely on derivatization of cellulose to reduce the energy input requirement. See, for example, US 2011/0036522. Chemical treatment may be used to reduce the energy input requirement, for example the use of an inorganic acid (see, for example, Cellulose (1998) 5, 19-32), or alkaline treatment, enzyme treatment, or a combination of any of these. It has also been proposed to combine wood pulp with a cellulose derivative prior to processing to reduce the required energy (see US 2012/0043039).

US 2012/0158955 discloses a process comprising swelling cellulose with an inorganic or organic swelling agent. The swollen cellulose can be converted to nanocellulose in a mechanical comminution process requiring less than 2000 Kw/t.

WO 2010/106053 A2 discloses a process for hydrolyzing cellulose to mono- and oligo saccharides. In the disclosed process cellulose is dissolved in an inorganic molten salt, for example a hydrate of zinc chloride. Hydrochloric acid is added to the solvent medium to drive hydrolysis to glucose. Example 5 of this reference shows that when no hydrochloric acid is added the hydrolysis product is predominantly sorbitol.

Thus, there is a particular need for a solvent based process for the conversion of cellulose to nanocellulose that avoids or minimizes formation of water soluble mono- and oligo saccharides.

BRIEF SUMMARY OF THE INVENTION

The present invention addresses these problems by providing a process for converting cellulose to nanocellulose, said process comprising the steps of:
  a. contacting a feedstock comprising a cellulose component with a substantially proton-free inorganic molten salt solvent medium, thereby dissolving the cellulose component of the feedstock;
  b. adding an anti-solvent to the inorganic molten salt solvent medium, thereby precipitating nanocellulose material;
  c. separating the nanocellulose from the inorganic molten salt solvent medium.

Another aspect of the invention comprises nanocellulose material obtained by the process.

Yet another aspect of the invention comprises lignin produced as a by-product of the process in case a lingo-cellulose feedstock is used.

BRIEF DESCRIPTION OF THE DRAWINGS

The features and advantages of the invention will be appreciated upon reference to the following drawings, in which.

DETAILED DESCRIPTION OF THE INVENTION

Definitions

Figure 1:
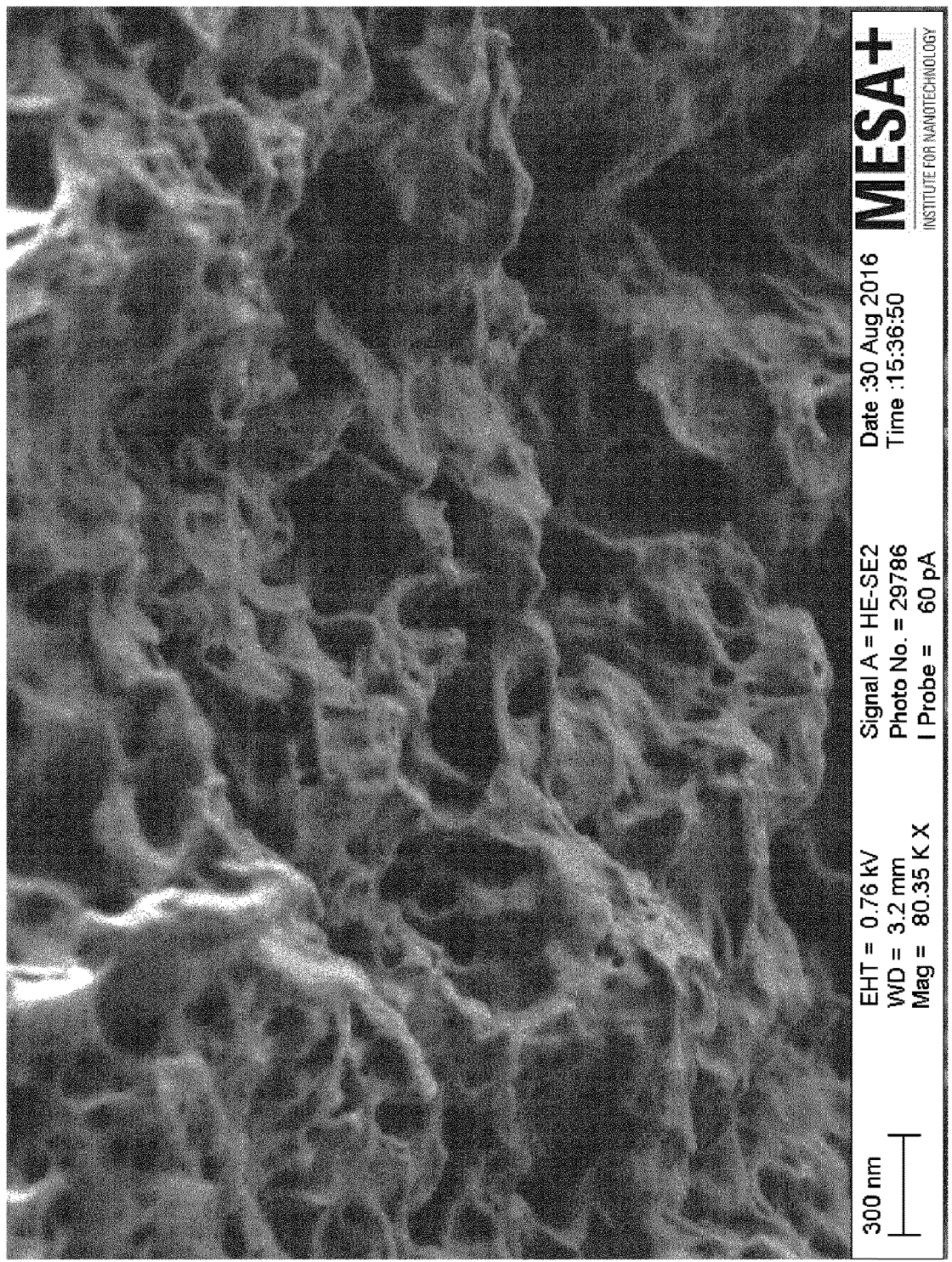
FIG. 1. SEM picture of dried nanocellulose material with partially agglomerated nanocellulose fibers.

The term "cellulose" as used herein refers to a polysaccharide polymer produced by virtually all land-based plants. The monomer of cellulose is glucose, which is a sugar molecule containing 6 carbon atoms. In many plants cellulose is mixed with hemicellulose (a co-polymer of C5 and C6 sugars); and/or with lignin. Materials such as wood pulp, a major source of cellulose, typically contains cellulose, hemicellulose and lignin. By contrast, cellulose obtained from the cotton plant is virtually lignin free. Cellulose as obtained from plants has a degree of polymerization (DP) anywhere in the range of from 1000 to 10,000.

The term "nanocellulose" as used herein refers to cellulose particles having an aspect ratio>1 and an average length in the range of from 15 nm to 900 nm. It can be obtained by defibrillating cellulose, for example through mechanical action, often in the presence of chemicals that weaken interparticle bonds between cellulose particles. The present invention provides a process comprising dissolving cellulose and precipitating nanocellulose from the solution, requiring little or no mechanical energy.

An aspect of the present invention is a process for converting cellulose to nanocellulose, said process comprising the steps of:
  a. contacting a feedstock comprising a cellulose component with a substantially proton-free inorganic molten salt solvent medium, thereby dissolving the cellulose component of the feedstock;
  b. adding an anti-solvent to the inorganic molten salt solvent medium, thereby precipitating nanocellulose;
  c. separating the nanocellulose from the inorganic molten salt solvent medium.

Inorganic molten salts have been disclosed in WO 2010/106053 A2 as being capable of dissolving cellulose. Inorganic molten salts share this property with many organic ionic liquids. Inorganic molten salts offer many important advantages over organic ionic liquids, the most important ones being much lower cost, and far greater temperature stability.

Preferred inorganic molten salts for use in the solvent media for the process of the present invention are the hydrates of zinc chloride, in particular zinc chloride tetrahydrate ($ZnCl_2.4H_2O$). On a weight basis, zinc chloride tetrahydrate comprises about 70% zinc chloride and about 30% water. The skilled person will appreciate that water present in a salt hydrate is not free water, but it bound to the salt molecules.

As shown in WO 2010/106053 A2, addition of protons to the inorganic molten salt medium, for example in the form of hydrochloric acid, catalyzes hydrolysis of the dissolved cellulose to glucose. When no hydrochloric acid is added, hydrolysis still takes place, but the predominant hydrolysis product is sorbitol instead of glucose (see Example 5 and FIG. 4 of WO 2010/106053 A2). Hydrolysis is undesirable in the process of the present invention, because it lowers the yield of nanocellulose and produces highly soluble by-products that are difficult to remove from the solvent medium.

The process of the present invention is based on the discovery that inorganic molten salt hydrates contain a small amount of protons, even when no proton source (such as hydrochloric acid) is added. The small amount of protons is sufficient to catalyze hydrolysis of dissolved cellulose. The process of the invention utilizes an inorganic molten salt solvent medium that is substantially proton-free.

For the purpose of the present invention, an inorganic molten salt solvent medium is considered substantially proton-free when less than 5% of cellulose dissolved in the medium is hydrolyzed to glucose.

There are various methods for making an inorganic molten salt medium substantially proton-free. For example, the solvent medium may be passed through a column of cation-exchange material, in which protons from the solvent are replaced with alkaline cations, such as lithium, sodium, potassium, calcium, magnesium, and the like. It is desirable to use a cation that does not contaminate the molten salt medium. Thus, if the molten salt is a zinc chloride hydrate, the preferred cation on the exchange column is $Zn^{2+}$. Solvent media that have been made substantially proton-free by this method may develop new protons over time. For this reason, such solvents should be used in the process within a short time after having been passed through the cation exchange column.

An alternate method for making an inorganic molten salt solvent medium substantially proton-free is the addition of a proton scavenger. For the purpose of the present invention, the oxide or hydroxide of any metal being a stronger reducing agent than hydrogen can be used as a proton scavenger. The skilled person will appreciate that the reduction potential of a metal relative to hydrogen can be readily ascertained by consulting a redox table. Most redox tables set the redox potential of hydrogen at zero, so that the redox potential of any metal in the table is reported relative to that of hydrogen.

Suitable proton scavengers include the oxides and hydroxides of alkali metals and alkaline earth metals, and the oxides and hydroxides of non-noble transition metals. It is desirable to use the oxide or hydroxide of the corresponding molten salt. For example, if a hydrate of zinc chloride is used as the inorganic molten salt, preferred proton-scavengers are ZnO and $Zn(OH)_2$.

The proton scavenging may proceed via a multi-step reaction. For example, the proton-scavenging effect of ZnO in a zinc chloride is believed to comprise the following reaction steps:

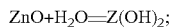

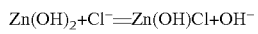

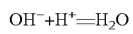

Whether these reactions do indeed take place, and whether there may be alternate reaction schemes proceeding along parallel paths, is difficult to determine with certainty. The precise mechanism is not important to the present invention. The key aspect is the presence of a strong base, which keeps the proton concentration very low.

The definition of pH is the negative logarithm of the molar proton concentration. In aqueous solutions protons are believed to be bound to water molecules, and often the symbol $H_3O^+$ is used instead of the symbol $H^+$ for this reason. Commercial pH meters are available for measuring the pH of an aqueous solution. Such pH meters are typically calibrated against buffer solutions having a known pH value, for example 7 or 4.

The ionic molten salt solvent media are strongly acidic, but the $-\log [H^+]$ value should be very high because of the low value of $[H^+]$. When the pH of a 70% $ZnCl_2$/30% $H_2O$ molten salt hydrate is measured with a commercially available pH meter (for example a Methohm 907 Titrando or a Methohm 744), a very low value in the range of −0.8 to −1.1 is registered. This is consistent with the strongly acidic nature of the liquid, but inconsistent with the very low proton concentration.

ZnO is poorly soluble in the zinc chloride tetrahydrate molten salt. A saturated solution is prepared by mixing 1500 grams of the molten salt with 5 grams of ZnO at room temperature. After stirring for 480 minutes the undissolved ZnO is removed by filtration. The resulting liquid registered a "pH value" of −0.65 on a Methohm 744, reflecting a slight increase in pH value comparing to initial zinc chloride tetrahydrate molten salt. Although the meaning of this reading is unclear, the slight increase in pH is consistent with the presence of a small amount of dissolved ZnO in the molten salt hydrate.

In step a. of the process, a feedstock comprising cellulose is dissolved in the solvent medium. The feedstock may consist almost entirely of cellulose, for example cotton linters or delignified wood pulp. It is also possible to use a lignocellulosic feedstock, such as wood chips or sugar cane bagasse.

The cellulose component of the feedstock is dissolved in the solvent medium by stirring for about 20 to about 60 minutes, at a temperature in the range of from room temperature to 120° C., preferably in the range of from 70° C. to 100° C. Depending on the cellulose feedstock that was used, the solution may contain significant amounts of insoluble material, for example lignin. It is desirable to remove undissolved solids, for example by filtration, before carrying out step b.

In step b., dissolved cellulose, having been converted to nanocellulose, is precipitated from the solvent medium by adding an anti-solvent. Any liquid that does not dissolve nanocellulose and that is miscible with the inorganic molten salt medium can be used as an anti-solvent. Examples include water and alcohols having from 1 to 6 carbon atoms, for example tertiary-butyl alcohol (TBA).

The selection of the anti-solvent has an effect on the yield of nanocellulose product and on its composition. Alcohols precipitate more nanocellulosic product from the solution than does water, resulting in a higher yield. The alcohol precipitate contains more short chain product than does the water precipitate, which may be undesirable for certain applications.

In step c. the precipitated nanocellulose is separated from the solvent medium. It has been found that the material can be readily separated from the solvent medium by filtration.

Nanocellulose prepared by this process has been analysed under a scanning electron microscope (SEM). The microscope pictures show a mass of fibers, in which some individual fibers can be discerned. Individual fibers appear to have a length of less than 1 μm (i.e., less than 1000 nm) and a diameter on the order of 20-50 nm.

The degree of polymerization (DP) of the nanocellulose material was determined by measuring the viscosity of an aqueous gel formed with the material. The DP was about 800, as compared to about 3,000 for the cellulose in the feedstock.

The solvent medium can be readily regenerated after use in the process. The main contaminants are the anti-solvent, and reaction products that are soluble in the molten salt/anti-solvent mixture (primarily oligosaccharides). The anti-solvent can be removed by evaporation, preferably under reduced pressure. After condensation the anti-solvent is available for re-use.

Dissolved reaction products can be removed by adsorption, by extraction, or a combination thereof.

As mentioned earlier, lignin from the feedstock can be recovered by filtration from the solution formed in step a. As compared to lignin from a conventional wood pulping process, the lignin by-product of the process of this invention is of much greater purity.

The following is a description of certain embodiments of the invention, given by way of example only and with reference to the figures.

Example 1

Cellulose, long fibers, was mixed with 70% $ZnCl_2/H_2O$ (corresponding to $ZnCl2.4H2O$) solvent in a stirred tank reactor to form a 5-10 wt. % content homogeneous mixture. The mixture was kept under continuous stirring at 90° C. for 20 min. After the heating step, water was added to the reactor to get concentration of $ZnCl2$ below 30 wt. % and to precipitate nanocellulose as particulates. The final mixture was kept under stirring for 30 min, and the formed nanocellulose solid particulates were separated by filtration, washed with distilled water till no $ZnCl2$ in the washed liquid, and stored as a water suspension with 10-12 wt. % dry solids.

Example 2

After precipitation according to example 1 the formed solid particulates were removed by centrifugation (5000-7000 rpm; 400 ml centrifugation vial). Liquid phase was removed from the centrifugation vial keeping solid residue in it. The vial was filled with distilled water (300 ml), shaken to make a homogeneous suspension and centrifuged again. This procedure was repeated at least 6 times to get $ZnCl_2$ concentration below 100 ppm. After the last washing nanocellulose solids were removed from the centrifugation vial and kept as a water suspension with 10-12 wt. % dry solids.

Example 3

After cellulose dissolution as per example 1, solids precipitation was performed by different antisolvent media (coagulant)—acetone, ethanol, t-butyl alcohol, etc. Solid separation and washing can be performed either by centrifugation or by filtration. The obtained nanocellulose samples were stored as suspensions in the corresponding coagulant with 10-12 wt. % dry solids.

Example 4

The obtained nanocellulose particles can be stored as a suspension with higher or lower dry solid content by adding or removing an appropriate coagulant to a desired dry solid content in the suspension.

Example 5

After precipitation and washing (examples 1, 2 and/or 3) nanocellulose was obtained as a dry powder by removing of the remaining coagulant by evaporating, by vacuum drying, by drying under supercritical $CO_2$ or by freeze drying. FIG. 1. shows an example of cellulose dried under supercritical $CO_2$ conditions.

Example 6

Figure 2:
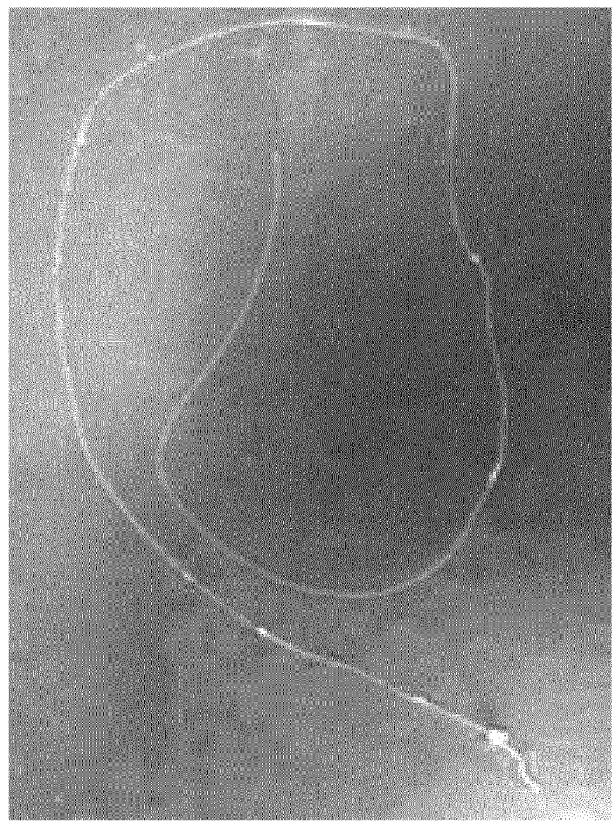
FIG. 2. Nanocellulose material shaped as a cellulose thread after nanocellulose separation by spinning out into antisolvent media.

Nanocellulose was produced in a shaped form as a thread or fiber by spinning out the cellulose/70% $ZnCl_2/H_2O$ mixture into an antisolvent, for example acetone. The formed thread can be washed by coagulant and dried. FIG. 2. shows an example of cellulose thread made by spinning out of 8% cellulose/70% $ZnCl_2/H_2O$ solution into acetone.

Example 7

Wood particles of 2-3 mm size were mixed with 70% $ZnCl_2/H_2O$ solvents in a stirred tank reactor to form a 5-10 wt % content homogeneous mixture. The mixture was kept under continuous stirring at 90° C. for 20 min. After the heating step, remaining solids (mainly lignin) were removed from the solution by filtration. The remaining liquid was mixed with water reactor to get the $ZnCl_2$ concentration below 30 wt % and to precipitate nanocellulose as particulates. The final mixture was kept under stirring for 30 min, and the formed nanocellulose solid particulates were separated by filtration, washed with distilled water till no $ZnCl_2$ in the washed liquid, and stored as a water suspension with 10-12 wt. % dry solids or as a dry nanocellulose.

Thus, the invention has been described by reference to certain embodiments discussed above. It will be recognized that these embodiments are susceptible to various modifications and alternative forms well known to those of skill in the art. For example, the cellulose feedstock may be modified by using bagasse, switch grass, or any other abundant cellulose source. The antisolvent may be substituted with another alcohol or ketone. Lignin produced as a by-product may be further processed into platform chemicals.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:
1. A process for converting cellulose to nanocellulose, said process comprising:
   making a proton free solvent medium by adding a proton scavenger to an inorganic molten salt hydrate wherein the inorganic molten salt hydrate is $ZnCl_2.4H_2O$,
   dissolving a feedstock comprising a cellulose component with the proton free-solvent medium, to form a solution comprising dissolved cellulose at a temperature in the range from 70 to 100° C., adding an anti-solvent to the solution, thereby precipitating nanocellulose from the solution; wherein undissolved solids from the solution are removed before adding the anti-solvent, separating the precipitated nanocellulose from the solution.

2. The process of claim 1, wherein the proton scavenger comprises ZnO.

3. The process of claim 1, wherein the inorganic molten salt solvent medium comprises a saturated solution of ZnO in $ZnCl_2 \cdot 4H_2O$.

4. The process of claim 1, wherein the anti-solvent is selected from the group consisting of (i) water; an alkanol having from 1 to 6 carbon atoms; and mixtures thereof.

5. The process of claim 4, wherein the solvent medium comprises reaction products that are soluble in the molten salt/anti-solvent mixture and wherein the step of regenerating the solvent medium comprises removing therefrom the dissolved reaction products.

6. The process of claim 5, wherein dissolved reaction products are removed by extraction, adsorption, or a combination thereof.

7. The process of claim 1, further comprising a step of regenerating the solvent medium after use in the process of claim 1.

8. The process of claim 7, wherein the step of regenerating the solvent medium comprises the step of evaporating the anti-solvent at reduced pressure.

9. The process of claim 1, wherein dissolving the feedstock comprising a cellulose component with the proton free solvent medium is carried out during 20 to 100 minutes.

10. The process of claim 1, wherein less than 5% of cellulose dissolved in the solvent medium is hydrolysed to glucose.

* * * * *